(12) United States Patent
Gamble et al.

(10) Patent No.: US 12,140,451 B2
(45) Date of Patent: Nov. 12, 2024

(54) SYSTEMS AND METHODS FOR ELEVATION TRACKING OF DEVICES

(71) Applicant: Verizon Patent and Licensing Inc., Basking Ridge, NJ (US)

(72) Inventors: Jerry Gamble, Grapevine, TX (US); Natasha Avinash Shah, Cambridge, MA (US); Aleena Taufiq, Iriving, TX (US); Peter Brockmann, Marlborough, MA (US); Syed B. Aziz, North Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 283 days.

(21) Appl. No.: 17/671,713

(22) Filed: Feb. 15, 2022

(65) Prior Publication Data

US 2023/0258449 A1 Aug. 17, 2023

(51) Int. Cl.
*G01C 5/06* (2006.01)
*G01C 25/00* (2006.01)

(52) U.S. Cl.
CPC .............. *G01C 5/06* (2013.01); *G01C 25/00* (2013.01)

(58) Field of Classification Search
CPC .................................. G01C 5/06; G01C 25/00
See application file for complete search history.

(56) References Cited

U.S. PATENT DOCUMENTS

| 2014/0200846 A1* | 7/2014 | Wachter ............... G01C 5/06 702/138 |
| 2022/0221365 A1 | 7/2022 | Mahurkar |
| 2022/0317309 A1 | 10/2022 | Gamble, Jr. |

OTHER PUBLICATIONS

Nguyen Hai Chau, "Estimation of Air Temperature Using Smartphones in Different Contexts", Journal of Information and Telecommunication, 2019, vol. 3, No. 4, pp. 494-507, 14 pages.

* cited by examiner

*Primary Examiner* — Walter L Lindsay, Jr.
*Assistant Examiner* — Andrew V Do

(57) ABSTRACT

One or more computing devices, systems, and/or methods for elevation tracking of devices are provided. Barometric pressure data points and elevation data points associated with a set of barometric measurement devices proximate a device are obtained. An interpolated field of barometric pressure is generated using the barometric pressure data points and the elevation data points. x, y location coordinates of the device are projected onto the interpolated field as a projected point within the interpolated field. Barometric leveling is executed upon a device barometric pressure value provided by the device and a barometric pressure data point at the projected point to determine a relative height difference between the device and the projected point. An elevation of the device is determined based upon the relative height difference.

20 Claims, 12 Drawing Sheets

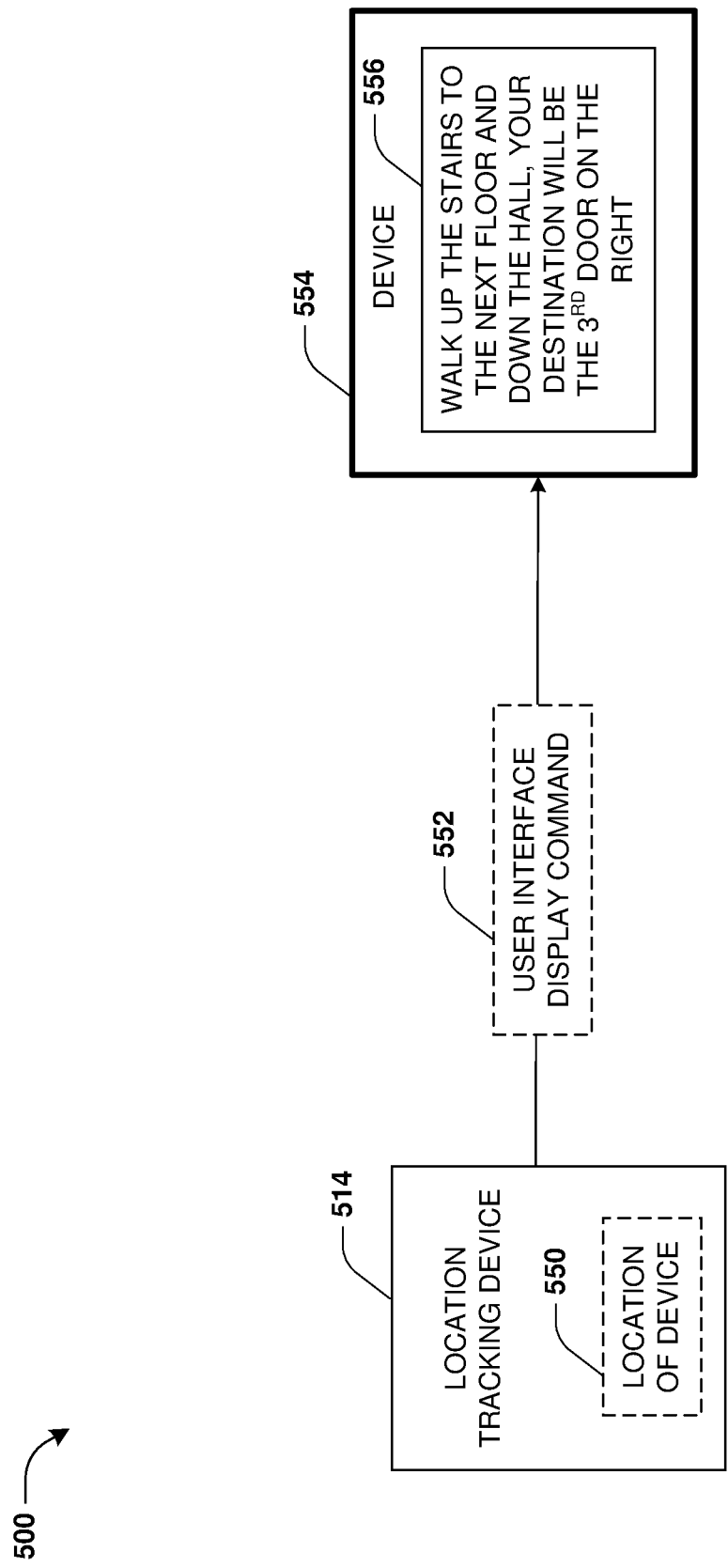

SYSTEMS AND METHODS FOR ELEVATION TRACKING OF DEVICES

BACKGROUND

There are many techniques for outdoor positional tracking of objects. These positional tracking techniques can be used to track the location and movement of various types of objects, such as a mobile device, a smart device, a cellular phone, an object such as inventory container or item with a local tracking beacon attached, a robot or drone, etc. Unfortunately, these positional tracking techniques are unable to accurately track devices that are indoors, such as a mobile device of a user walking around in a multi-story building.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 5E is a diagram illustrating an example scenario associated with elevation tracking for devices, where an action is performed based upon an elevation of a device;

DETAILED DESCRIPTION OF EXAMPLE EMBODIMENTS

Figure 1:
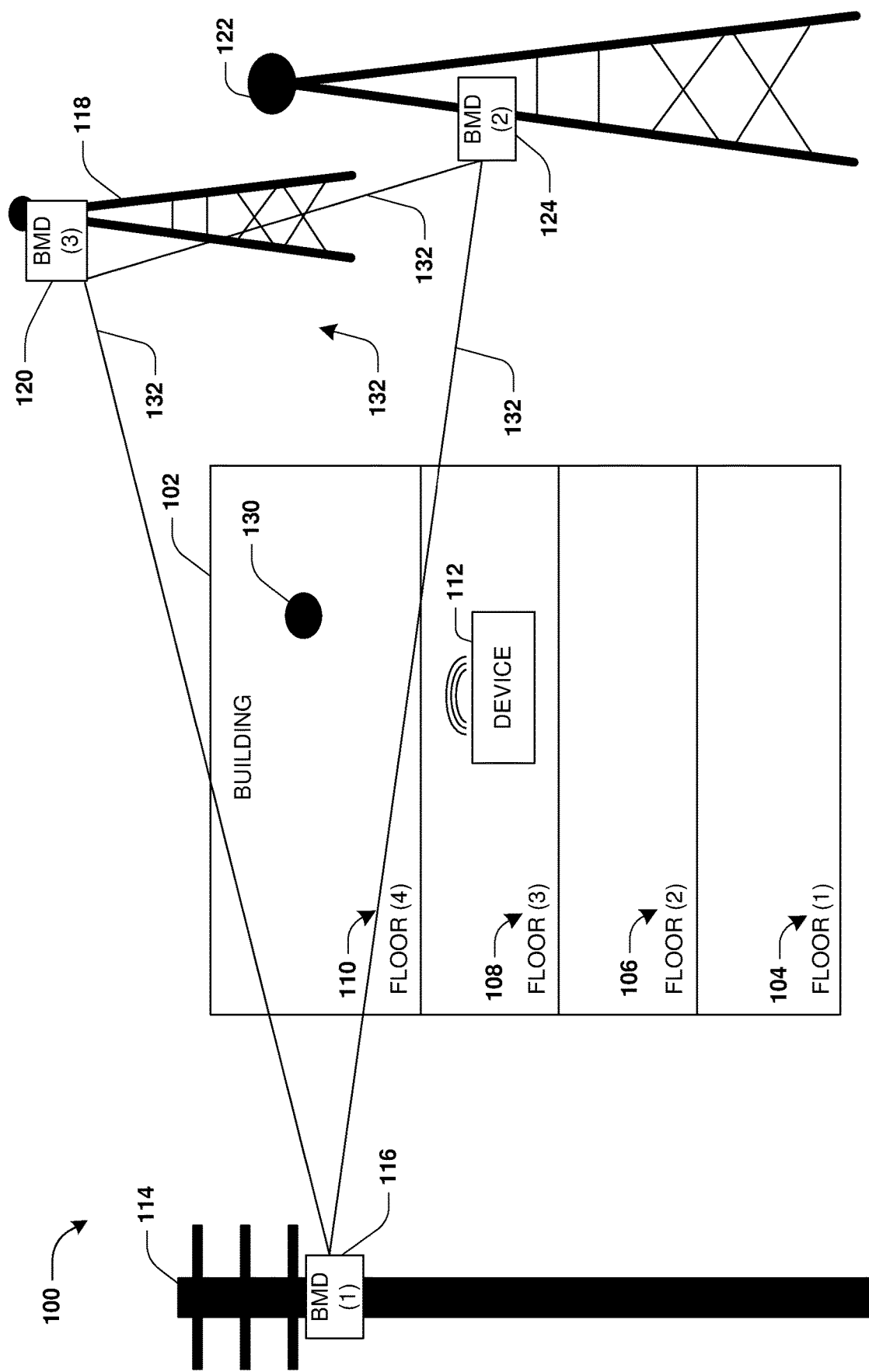
FIG. 1 is a diagram illustrating an example scenario associated with elevation tracking for devices.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for elevation tracking of devices are provided. Many location tracking techniques such as global positioning system (GPS) functionality, real-time kinematic (RTK) positioning, and 5G positioning, are unable to accurately track the location of devices within indoor locations. In particular, these location tracking techniques cannot accurately track z-axis elevation information of devices while indoors. Additionally, many mobile devices and Internet of Things (IoT) devices are not equipped with necessary hardware to use positioning technologies capable of accurately performing z-axis measurements.

Barometric leveling may be used to calculate z-axis information to determine elevation values of a device by using a difference in barometric pressure since barometric pressure changes with elevation in predictable ways. However, barometric leveling has various drawbacks that makes it alone unsuitable for many use cases for tracking elevation of devices within indoor locations. In particular, barometric leveling requires two reference points of barometric pressure data. In many use case scenarios, there may be only one reference point available. Additionally, both reference points must be taken from calibrated barometric pressure sensors. In many use case scenarios, there is no practical means to calibrate the barometric pressure sensors being used, such as those sensors of a consumer's cell phone. Both reference points must be taken very close in time, otherwise changes in ambient pressure makes the reference points unusable. Also, barometric leveling can only calculate the relative elevation between two reference points, and cannot calculate an absolute elevation of the device unless the height of one of the reference points is known. The reference points must be vertically aligned or the ground level must be consistent in a horizontal axis along a horizontal distance between the two reference points. Neither of these are practical assumptions for most use cases. Furthermore, temperature differences between the two reference points (e.g., one reference point is taken outdoors and another reference point is taken indoors) may invalidate the barometric leveling calculation since air pressure is influenced by ambient temperature. Accordingly, conventional barometric leveling is not practical or capable of accurately determining elevation of devices indoors for many use cases, such as tracking a mobile phone, smart wearable device, inventory or an object, an IoT device, a drone or robot, equipment, etc.

Accordingly, as provided herein, interpolated fields of barometric pressure are generated and used to accurately determine elevation of devices regardless of whether the devices are indoors or outdoors. An interpolated field of barometric pressure is generated through interpolation using barometric pressure data points from a network of barometric measurement devices of known elevation, such as barometric pressure sensors installed on weather stations, cell towers, etc. In this way, the interpolated field of barometric pressure represents interpolated points derived from barometric pressure data and elevation data associated with the barometric measurement devices. When determining the elevation of a device, longitude and latitude of the device may be identified as x, y location coordinates of the device such as through GPS or other location tracking technology. The x, y location coordinates may be projected onto the interpolated field of barometric pressure as a projected point within the interpolated field of barometric pressure. The barometric pressure and elevation of the projected point is known and accurate. This enables the ability to perform barometric leveling upon a device barometric pressure value measured by the device and a barometric pressure data point at the projected point in order to determine a relative height difference between the device and the projected point. The relative height difference may be added to or subtracted from an elevation of the projected point (depending on whether the device is located above or below the interpolated field) in order to calculate an elevation of the device.

Knowing the elevation (z-axis) and the x, y location coordinates of the device at a relatively high accuracy enables the ability to perform various types of actions. For example, a command may be generated and transmitted to the device to control the device, such as to control the state or actions of a robot or drone. The command and/or the location of the device may be transmitted to a different device, such as an emergency responder device used by an emergency responder that was called for help by a user of the device. The location information may be used by a location tracking service to display, through a user interface displayed on the device, a map of an indoor location and directions through the indoor location to a destination to help navigate the user through the indoor location such as an office building. It may be appreciated that various types of actions may be performed alone, together, or in any combination.

In addition to providing the capability to accurately determine elevation of the device regardless of whether the device is located indoors or outdoors, opportunistic calibration of the device is performed to calibrate barometric measurements generated by the device so that the device can calculate more accurate device barometric pressure data points. As part of opportunistic calibration, barometric pressure reading offsets are generated, which may be used to correct device barometric pressure values generated by the device so that the device barometric pressure values are more precise. Opportunistic calibration therefor improves the accuracy of a barometric pressure sensor measurement by the device. This is useful for consumer devices, IoT devices, and/or other devices that may not be equipped with highly accurate and calibrated barometric pressure sensors that could otherwise cost thousands of dollars per instance.

Elevation tracking and opportunistic calibration may be implemented by a location tracking device and a calibrator device. In some embodiments, the location tracking device and/or the calibrator device may be hosted by the same device or on separate devices. The location tracking device and/or the calibrator device may be hosted on the device being tracked, a different device, a server, an IoT device, communication networking equipment (e.g., a radio access network controller, a multi-access edge server, a base station, a baseband unit, a core network component, etc.), hardware, software, or combination thereof.

Various embodiments of the present technology provide for a wide range of technical effects, advantages, and/or improvements to computing systems, components, and devices (e.g., a smart device, a cellular device, a mobile device, an IoT device, user equipment, etc.). For example, various embodiments may include one or more of the following technical effects, advantages, and/or improvements: 1) performing opportunistic calibration to improve the accuracy of device barometric pressure values generated by devices, 2) improving the accuracy of barometric pressure sensor of certain types of devices (e.g., user equipment, cellular devices, smart wearable devices, consumer and commodity devices, IoT devices, etc.) that otherwise do not have calibrated and accurate barometric pressure sensors that could cost more than the devices themselves or are impractical to incorporate into these types of devices, 3) generating interpolated fields of barometric pressure with interpolated points derived from known barometric pressure data values and known elevation values, 4) using the interpolated fields of barometric pressure to accurately identify elevation of devices regardless of whether the devices are indoors or outdoors, and/or 5) implementing actions for various use cases based upon identified elevation of devices, such as 1) public safety to assist in tracking the vertical location of specific first responders in the field, 2) tracking an IoT asset's vertical location in a building (e.g., track equipment or drugs in a multi-story hospital, 3) tracking, controlling, and managing a drone or vehicular robot (e.g., monitoring and controlling drones during package delivery or agricultural monitoring), 4) tracking a user's location within a building (e.g., a high-rise office building) such as to control a navigation app (e.g., a corporate or campus real estate navigation app) to assist the user in navigating to a location such as a specific conference room), 5) controlling a robot to locate a vertical location of a product or assist in precisely picking out a product in a warehouse, 6) providing a user's vertical location to aid with e911 vertical z-axis compliance, and/or 7) improving accuracy and usefulness of location services for indoor environments.

FIG. 1 illustrates an example of a system 100 within which elevation tracking for devices may be implemented. A building 102 may comprise one or more floors, such as a first floor 104, a second floor 106, a third floor 108, and a fourth floor 110. A device 112 having a barometric pressure sensor may be located within the building 102, such as on the third floor 108. For example, a user may be carrying around a cellular phone as the device 112, the device 112 may be a robot or drone making a package delivery within the building 102, the device 112 may be attached to an object such as an inventory container or item within a warehouse or equipment within a hospital, etc. Location tracking of the device 112 within the building 102, including elevation tracking, may be implemented using an interpolated field of barometric pressure 132.

The interpolated field of barometric pressure 132 may be generated using barometric pressure data points and elevation data points associated with a set of barometric measurement devices (barometric pressure sensors), such as a first barometric measurement device 116, a second barometric measurement device 124, a third barometric measurement device 120, and/or any other number of barometric measurement devices. The barometric measurement devices may be located on cellular towers, buildings, weather stations, or any other type of structure. For example, the first barometric measurement device 116 may be installed on a weather station 114. The second barometric measurement device 124 may be installed on a cellular tower 122. The third barometric measurement device 120 may be installed on a cellular tower 118. The barometric measurement devices may be installed at known elevations on the structures. In this way, barometric pressure data points generated by the barometric measurement devices may be associated with known and/or accurate elevations. In some embodiments, the barometric measurement devices may be calibrated to output highly accurate barometric pressure data points (e.g., factory calibrated using a regulated pressure source), such as compared to barometric measurement devices (barometric pressure sensors) of consumer devices and IoT devices.

The interpolated field of barometric pressure 132 may be generated as a flat plane with vertices corresponding to locations of the barometric measurement devices 116, 120, 124. It may be appreciated that any number of barometric measurement devices may be used, and thus the interpolated field of barometric pressure 132 may be generated as a polygon with any number of vertices, and is not limited to a triangle with 3 vertices. The interpolated field of barometric pressure 132 may be used to identify an elevation (a z-axis coordinate) of the device 112 within the building 102, such as to make a determination that the device 112 is currently located on the third floor 108 of the building 102. In particular, x, y location coordinates (longitude and latitude) of the device 112 may be identified such as through GPS or other location tracking functionality. The x, y location coordinates may be projected onto the interpolated field of barometric pressure 132 as a projected point 130 within the interpolated field of barometric pressure 132 (e.g., a normal of the x, y location coordinates may be projected to the flat plane of the interpolated field of barometric pressure 132). The projected point 130 has an interpolated barometric pressure value derived from the barometric pressure data points associated with the first barometric measurement device 116, the second barometric measurement device 124, and/or the third barometric measurement device 120. The projected point 130 has an interpolated elevation (a z-axis coordinate) derived from the elevation data points of the first barometric measurement device 116, the second barometric measurement device 124, and/or the third barometric measurement device 120.

Barometric leveling is performed upon the barometric pressure data point at the projected point 130 (the interpolated barometric pressure value) and a device barometric pressure value measured by the device 112. The device barometric pressure value (at 112) is compared to the interpolated barometric value (at projected point 130) to determine a relative height difference between the device 112 and the projected point 130. The relative height difference corresponds to a pressure difference between the barometric pressure value provided by the device 112 and the barometric pressure data point (the interpolated pressure value) assigned to the projected point 130. Because the device 112 is below the projected point 130, the relative height difference is subtracted from the elevation (the interpolated elevation) of the projected point 130 in order to determine an elevation of the device 112. The elevation may be compared to structural building information of the building 102 to determine that the device 112 is currently on the third floor 108 of the building 102. Various actions may be performed based upon the elevation of the device 112. For example, a location (e.g., the x, y location coordinates and a z location coordinate determined based upon the elevation of the device 112) may be transmitted to a remote device so that a user of the remote device, such as a first responder, can with confidence, accurately locate the user at the device 112.

In another example, navigation instructions may be generated and displayed on a map through a user interface on the device 112.

Figure 2:
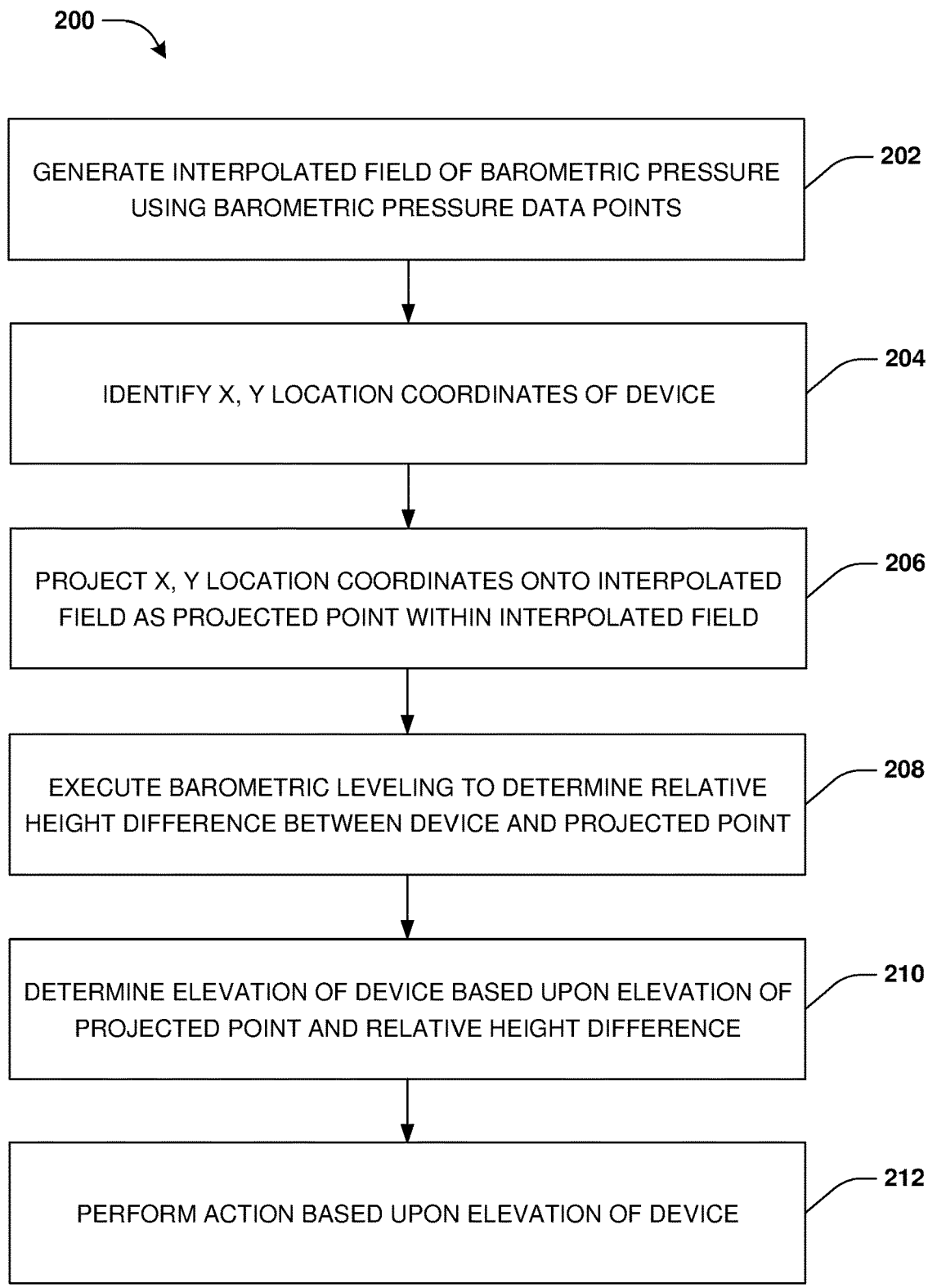
FIG. 2 is a flow chart illustrating an example method for elevation tracking for devices.
Figure 3:
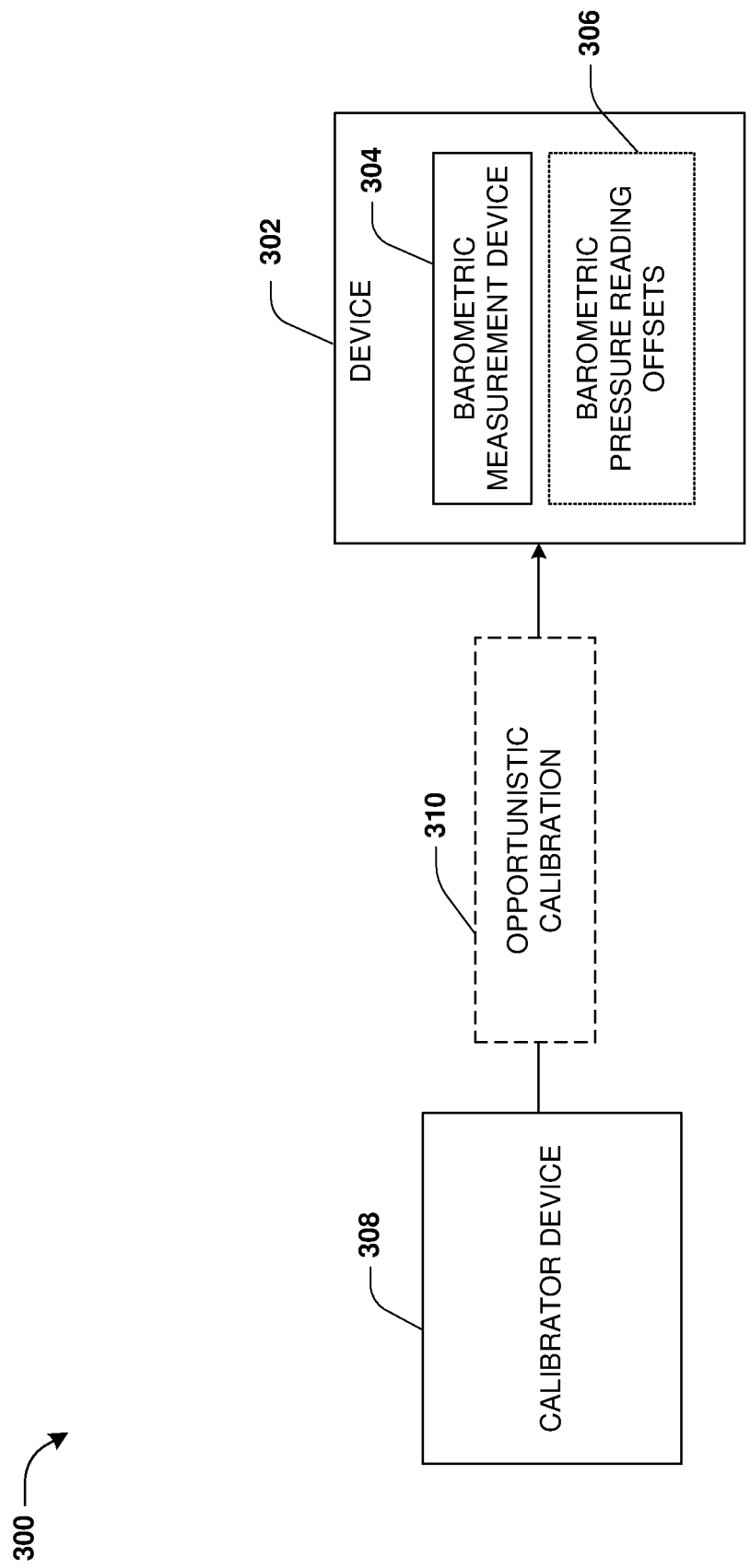
FIG. 3 is a diagram illustrating an example scenario associated with elevation tracking for devices, where opportunistic calibration is performed.
Figure 4:
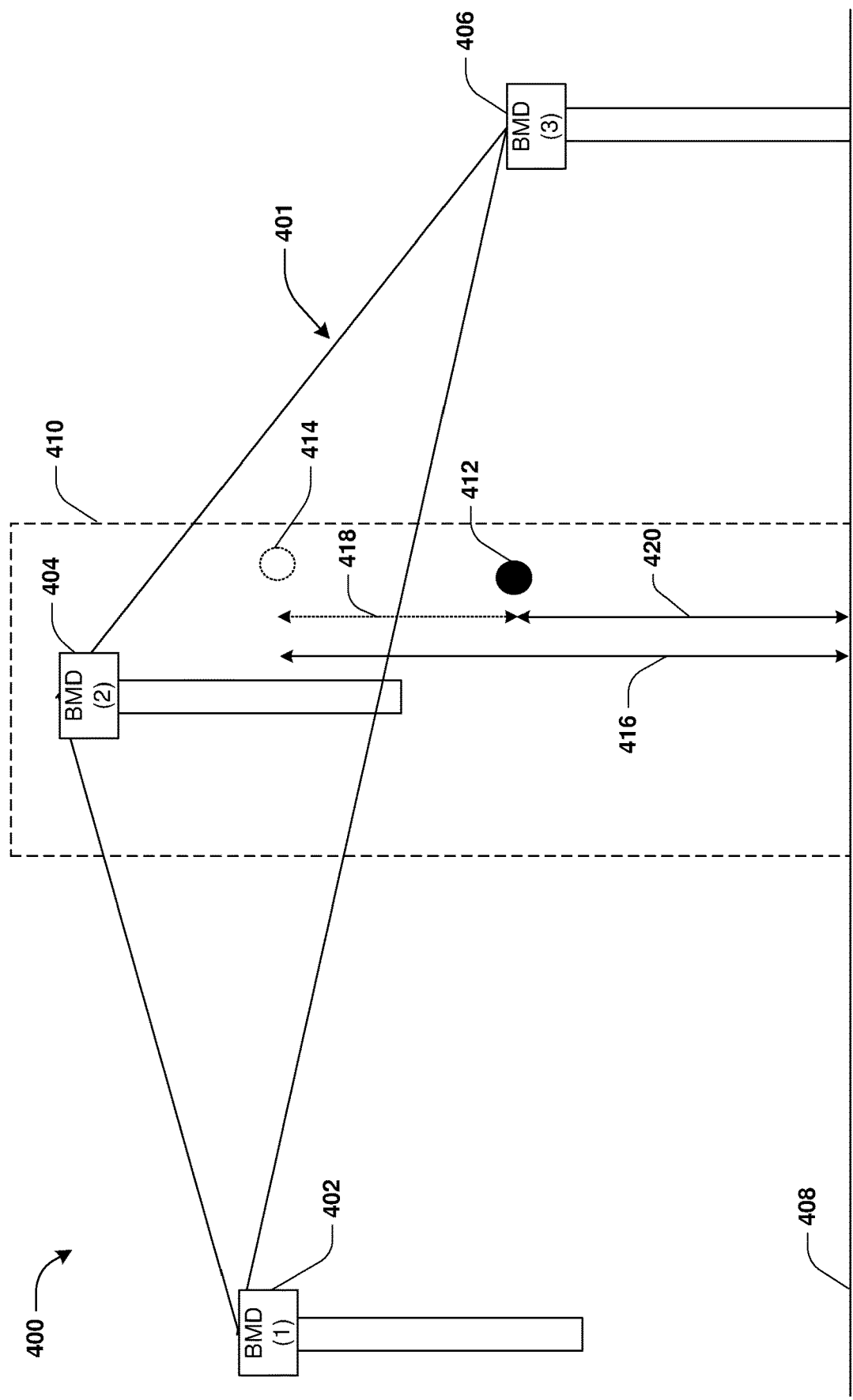
FIG. 4 is a diagram illustrating an example scenario associated with elevation tracking for devices using an interpolated field of barometric pressure.

FIG. 2 illustrates an example of a method 200 for elevation tracking for devices, which is further described in conjunction with system 300 of FIG. 3, system 400 of FIG. 4, and system 500 of FIGS. 5A-5E. A calibrator device 308 may be configured to perform opportunistic calibration 310 for a barometric measurement device 304 (a barometric pressure sensor) of a device 302 in order to improve the accuracy of device barometric pressure values generated by the barometric measurement device 304.

Various triggers may be set to determine when the calibrator device 308 is to perform the opportunistic calibration 310. In some embodiments, the opportunistic calibration 310 is triggered based upon a determination that a sensor of the device 302 indicates a change in surrounding conditions since a previous opportunistic calibration was performed and/or based upon the device 302 being located outdoors. The change in surrounding conditions may be detected based upon a change in magnetic field detected by the sensor, a change in speed of the device 302 detected by the sensor (e.g., the device 302 is now traveling at the speed of a car or airplane instead of walking around), a change in barometric pressure detected by the sensor (e.g., the barometric measurement device 304), a change in sound level detected by the sensor (e.g., a sound level previously indicated that the user was in a quiet area such as a bedroom sleeping and now indicates that the user is outside surrounded by noisy traffic), etc. In some embodiments, the opportunistic calibration 310 is triggered based upon a determination that the device 302 has travelled a threshold distance since the previous opportunistic calibration and/or based upon the device 302 being located outdoors.

In some embodiments, the device 302 may be identified as being indoors or outdoors using soundscape fingerprinting, building polygons, or transition detection. Soundscape fingerprinting may utilize a model (e.g., a machine learning model) to determine if a sound profile at a current location of the device 302 matches certain patterns (e.g., traffic noise, sound of nature, white noise of an office building, etc.) that the model has been designed to detect as indoors or outdoors. Location tracking functionality such as GPS, RTK, or 5G positioning may be used to identify a location of the device 302, which may be queried against a database of building polygons to determine whether the device 302 is located within a building or outside. Transition detecting may use a model (such as a machine learning model) developed to detect transitions from outdoors to indoors or indoors to outdoors based upon sensor data (e.g., location data, sound data, changes in speed, imagery, barometric pressure data, temperature data, etc.).

As part of performing the opportunistic calibration 310, outdoor barometric measuring systems may be used to calibrate the barometric measurement device 304 to compensate for device specific inaccuracies of the barometric measurement device 304 when generating device barometric pressure values (e.g., device barometric pressure values generated when indoors for elevation tracking). The opportunistic calibration 310 outputs barometric pressure reading offsets 306 that can be applied to device barometric pressure values in order to correct the device barometric pressure values. These corrected device barometric pressure values are more accurate for elevation-determining purposes than the original device barometric pressure values.

In some embodiments, the opportunistic calibration 310 is performed by using real-time kinematic positioning to determine x, y, z location coordinates of the device 302. The x, y, z location coordinates of the device 302, device barometric pressure values generated by the barometric measurement device 304, and barometric pressure data points retrieved by the calibrator device 308 from the outdoor barometric measuring systems may be used to generate the barometric pressure reading offsets 306 as compensation values. These compensation values can be added to or subtracted from subsequently generated device barometric pressure values to correct these device barometric pressure values in order to improve the accuracy of the device barometric pressure values. In particular, an elevation of the device 302 may be determined from the x, y, z location coordinates. The barometric pressure data points and elevation data points from the outdoor barometric measuring systems and the elevation of the device 302 may be used to determine what the actual barometric pressure should be at the elevation of the device 302 using interpolated fields of barometric pressure. For example, the elevation of the device 302 may be projected onto an interpolated field of barometric pressure as a projected point whose assigned barometric pressure (an interpolated barometric pressure derived from the barometric pressure data points of the outdoor barometric measuring systems) is the actual barometric pressure that should be detected. This technique is further described in relation to FIG. 4. The actual barometric pressure (the interpolated barometric pressure) is compared to a device barometric pressure value generated by the barometric measurement device 304, and a difference between these values is stored as the barometric pressure reading offsets 306.

Other techniques may be used to determine the location of the device 302 such as the elevation of the device 302 for use by the calibrator device 308 to perform the opportunistic calibration 310. For example, a current elevation of the device 302 with respect to a cell site may be determined such as by using 5G positioning. In particular, a tangent of theta calculation and an elevation of the cell site are used for interpolation (e.g., interpolation used to generate interpolated fields of barometric pressure) for determining the current elevation of the device 302. That is, various information about the cell site may be retrieved from the cell site, such as height, latitude and longitude, antenna tilt, etc. An angle, such as an angle of elevation or departure from the cell site to the device 302, may be determined. An index system may be used to obtain a round trip time (RTT) value between the cell site and the device 302. Using the angle and a distance derived from the RTT value, a geometric function may be used to calculate a height from the antenna to the device 302. This value is either added to or subtracted from the elevation of the antenna depending on whether the device 302 is above or below the antenna to determine as estimated elevation of the device 302. In this way, the elevation of the device 302, device barometric pressure values measured by the device 302, and barometric pressure data points from the outdoor barometric measuring systems are used by the calibrator device 308 to perform the opportunistic calibration 310 to generate the barometric pressure reading offsets 306 used to improve the accuracy of device barometric pressure values generated by the barometric measurement device 304.

FIG. 4 illustrates an example of determining an elevation of a device 412 using interpolated fields, which may be used by the calibrator device 308 to perform the opportunistic calibration 310 and/or may be used by a location tracking device 514 to perform various actions. The device 412 may be currently located indoors, such as within a building 410. As part of determining the elevation of the device 412 with respect to a ground level 408, barometric pressure data points and elevation data points associated with a set of barometric measurement devices proximate the device 412 may be retrieved. For example, a first barometric measurement device 402, a second barometric measurement device 404, and a third barometric measurement device 406 may be identified based upon the barometric pressure devices being within a threshold distance of a current location (longitude and latitude) of the device 412.

During operation 202 of method 200, an interpolated field of barometric pressure 401 is generated using the barometric pressure data points and the elevation data points associated with the set of barometric measurement devices. Each point within the interpolated field of barometric pressure 401 may be associated with a barometric pressure data point (an interpolated pressure value) and a corresponding elevation data point (an interpolated elevation value). In particular, the barometric pressure data points and the elevation data points from the set of barometric devices are interpolated together to create interpolated pressure values and interpolated elevation values for points within the interpolated field of barometric pressure.

During operation 204 of method 200, x, y location coordinates of the device 412 may be identified. The x, y location coordinates may be identified from longitude and latitude values of the device 412. For example, the longitude and latitude values may be determined from GPS and/or other location data of the device 412.

During operation 206 of method 200, the x, y location coordinates of the device 412 are projected onto the interpolated field of barometric pressure 401 as a projected point 414 within the interpolated field of barometric pressure 401. The projected point 414 may have an interpolated elevation data point/value (elevation 416 from ground level 408) and/or an interpolated barometric pressure data point/value derived through interpolation of the barometric pressure data points and elevation data points from the set of barometric measurement devices when generating the interpolated field of barometric pressure 401. For example, elevation data points from the first barometric measurement device 402, the second barometric measurement device 404, and/or the barometric measurement device 406 may be interpolated to assign the interpolated elevation data point/value (elevation 416 from ground level 408) to the projected point 414. Barometric pressure data points from the first barometric measurement device 402, the second barometric measurement device 404, and/or the barometric measurement device 406 may be interpolated to assign the interpolated barometric pressure data point/value to the projected point 414.

During operation 208 of method 200, barometric leveling is executed upon a device barometric pressure value measured by the device 412 and the barometric pressure data point (the interpolated pressure value) assigned to the projected point 414 to determine a relative height difference 418 between the device 412 and the projected point 414. Barometric leveling is capable of determining a difference between two points given barometric pressures at those two points. In this way, the relative height difference 418 between the device 412 and the projected point 414 can be determined based upon the device barometric pressure value provided by the device 412 and the barometric pressure data point (the interpolated pressure value) assigned to the projected point 414.

In some embodiments, temperature can affect barometric pressure measurements. If the barometric pressure data point (the interpolated pressure value) assigned to the projected point 414 was derived from barometric pressure measurements by the set of barometric measurement devices outside and the device barometric pressure value is measured by the device 412 while inside the building 410, then these measurements can be skewed in some situations. Accordingly, the device barometric pressure value may be adjusted based upon the device 412 being detected as being indoors such as inside the building 410. The device barometric pressure value may be adjusted based upon a temperature difference between an outdoor temperature and an indoor temperature inside the building 410. In some embodiments, an indoor average temperature assumption may be used as the indoor temperature (e.g., an average of temperatures of similar buildings as the building 410 for the particular time of year such as 72 degrees Fahrenheit). In some embodiments, an ambient temperature reading by the device 412 may be used as the indoor temperature. In some embodiments, a machine learning model may be implemented to predict ambient temperature from a battery temperature of the device 412 and a proximity sensor of the device 412.

During operation 210 of method 200, an elevation 420 of the device 412 (e.g., an elevation from ground level 408 along a z-axis) may be determined by either adding or subtracting the relative height difference 418 from the elevation 416 of the projected point 414 (e.g., the interpolated elevation value) assigned to the projected point 414). If the device 412 is below the interpolated field of barometric pressure 401, as illustrated by FIG. 4, then the relative height difference 418 is subtracted from the elevation 416 of the projected point 414 to determine the elevation 420 of the device 412. If the device 412 is above the interpolated field of barometric pressure 401, then the relative height difference 418 is added to the elevation 416 of the projected point 414 to determine the elevation 420 of the device 412.

Figure 5A:
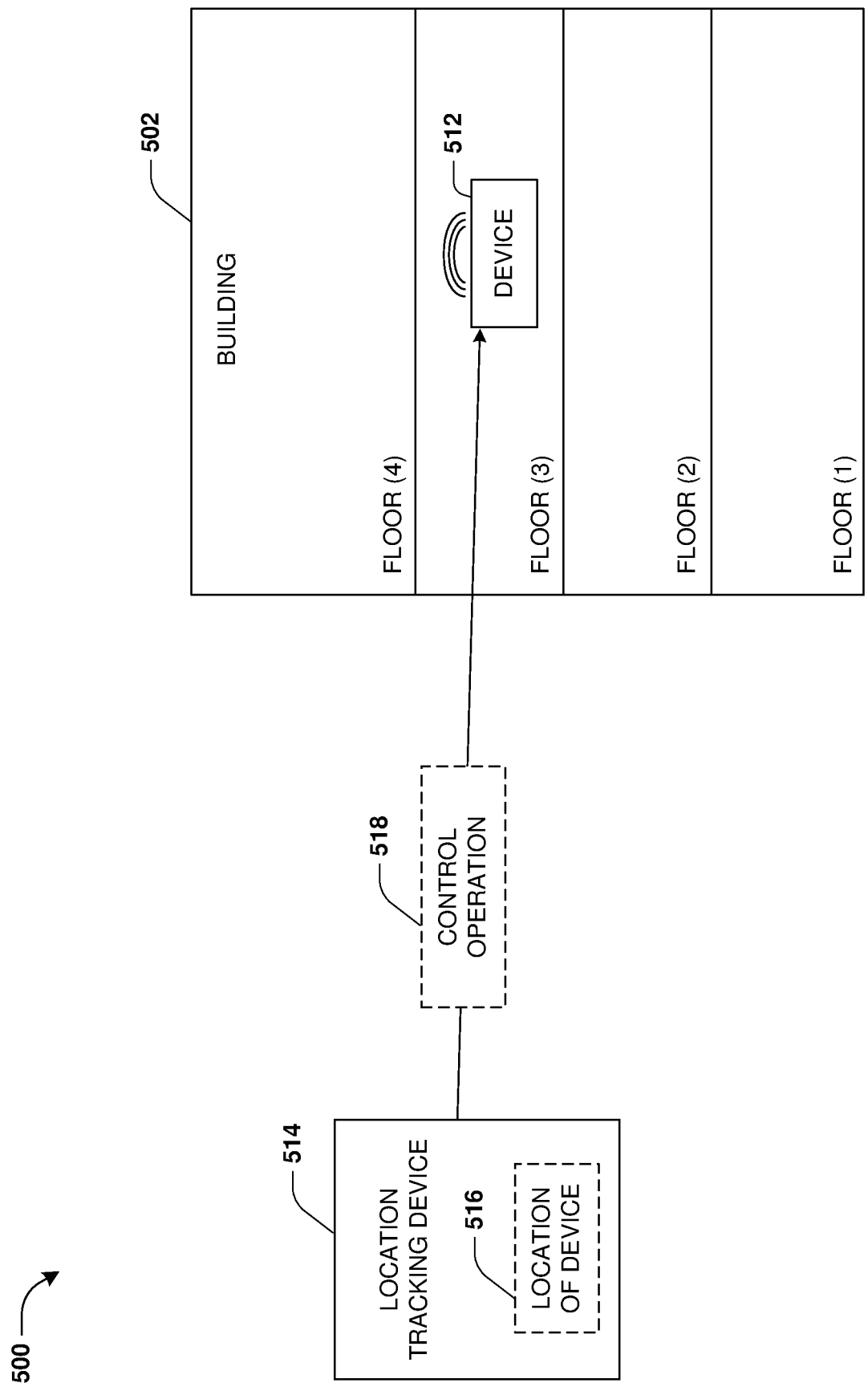
FIG. 5A is a diagram illustrating an example scenario associated with elevation tracking for devices, where an action is performed based upon an elevation of a device.

Once the elevation 420 of the device 412 is determined, various actions may be performed, during operation 212 of method 200. FIG. 5A illustrates an example of a location tracking device 514 using location information 516 of a device 512 to implement an action to generate and transmit a control operation 518 to the device 512 in order to control operation of the device 512. For example, the device 512 may be a robot within a warehouse building 502. The location tracking device 514 may receive a notification that the robot has been assigned a task to retrieve an inventory item from the fourth floor of the warehouse building 502. The location tracking device 514 may evaluate the location information 516 of the device 512 (robot) to determine that the device 512 is on the third floor of the warehouse building 502. Accordingly, the location tracking device 514 may transmit the control operation 518 (e.g., robot movement control instructions) to control movement of the device 512 (robot) to move from the third floor to a location of the inventory item on the fourth floor.

Figure 5B:
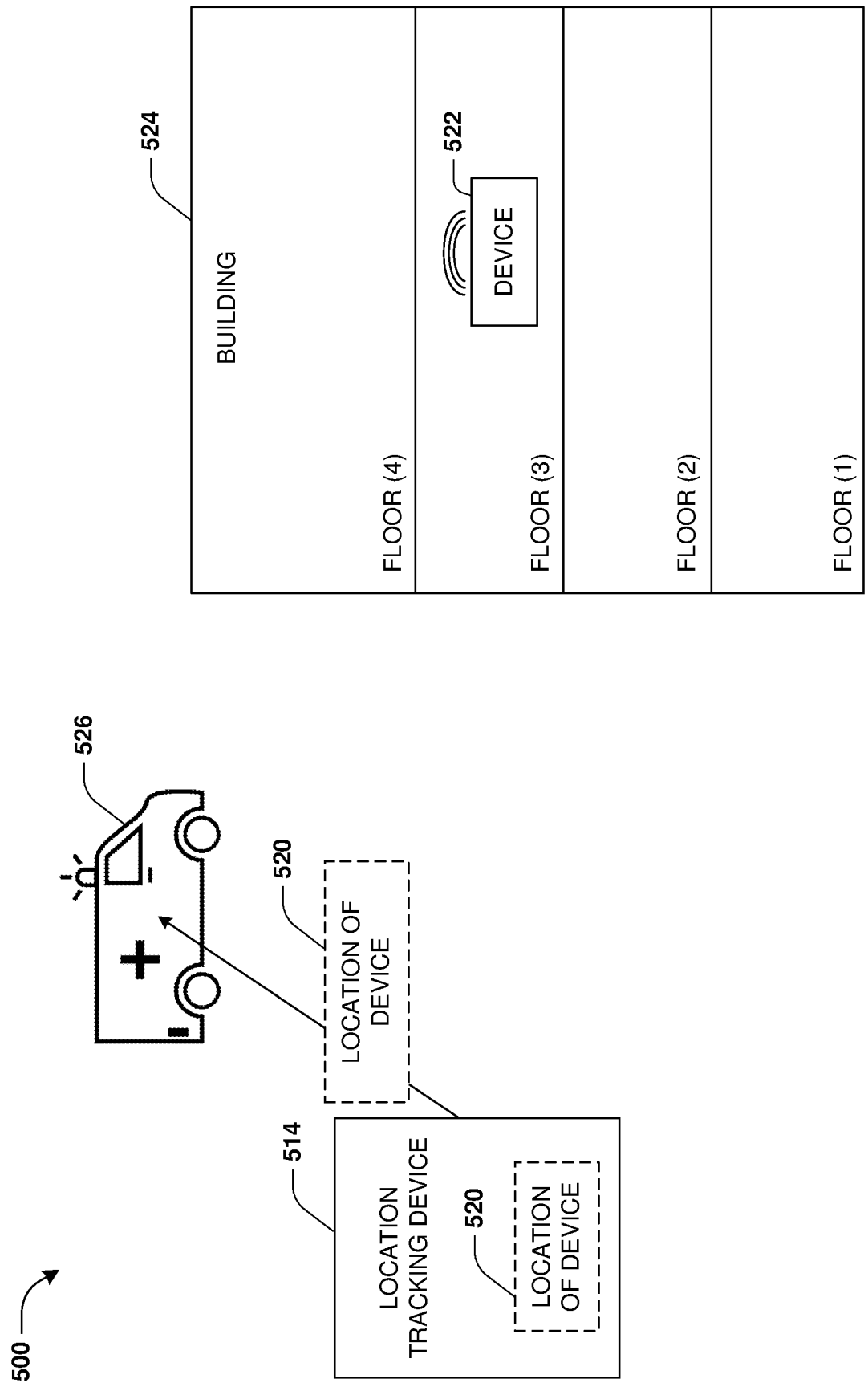
FIG. 5B is a diagram illustrating an example scenario associated with elevation tracking for devices, where an action is performed based upon an elevation of a device.

FIG. 5B illustrates an example of the location tracking device 514 using location information 520 of a device 522 (e.g., z, y location coordinates, an elevation of the device 522, a vertical location of the device 522 derived from the elevation, etc.) to implement an action to generate and transmit the location information 520 to a requesting device 526 and/or an emergency dispatch system. For example, the location tracking device 514 or a system hosting the location tracking device 514 may receive a safety alert from the requesting device 526. The safety alert may request a current location of the device 522 (e.g., a user of the device 522 may have activated a 911 alert). The location information 520 may be transmitted to the requesting device 526 for locating the device 522 on the third floor of the building 524.

Figure 5C:
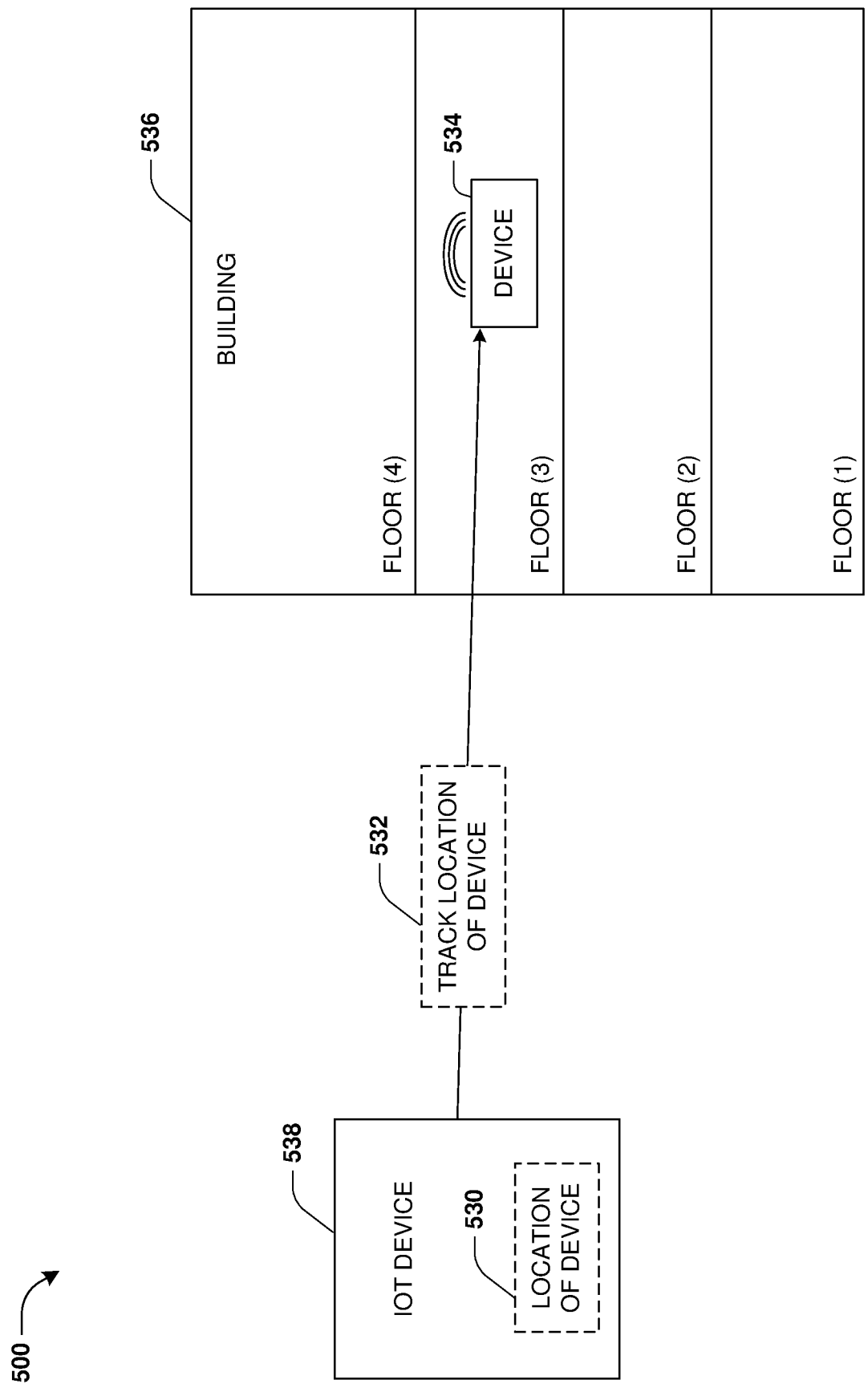
FIG. 5C is a diagram illustrating an example scenario associated with elevation tracking for devices, where an action is performed based upon an elevation of a device.

FIG. 5C illustrates an IoT device 538 executing an action using location information 530 of a device 534 within a building 536 to track 532 a location of the device 534. For example, the device 534 may be equipment or a tracking device attached to medicine within a hospital. The IoT device 538 can use the location information 530 to track the equipment or medicine as it moves around the building 536.

Figure 5D:
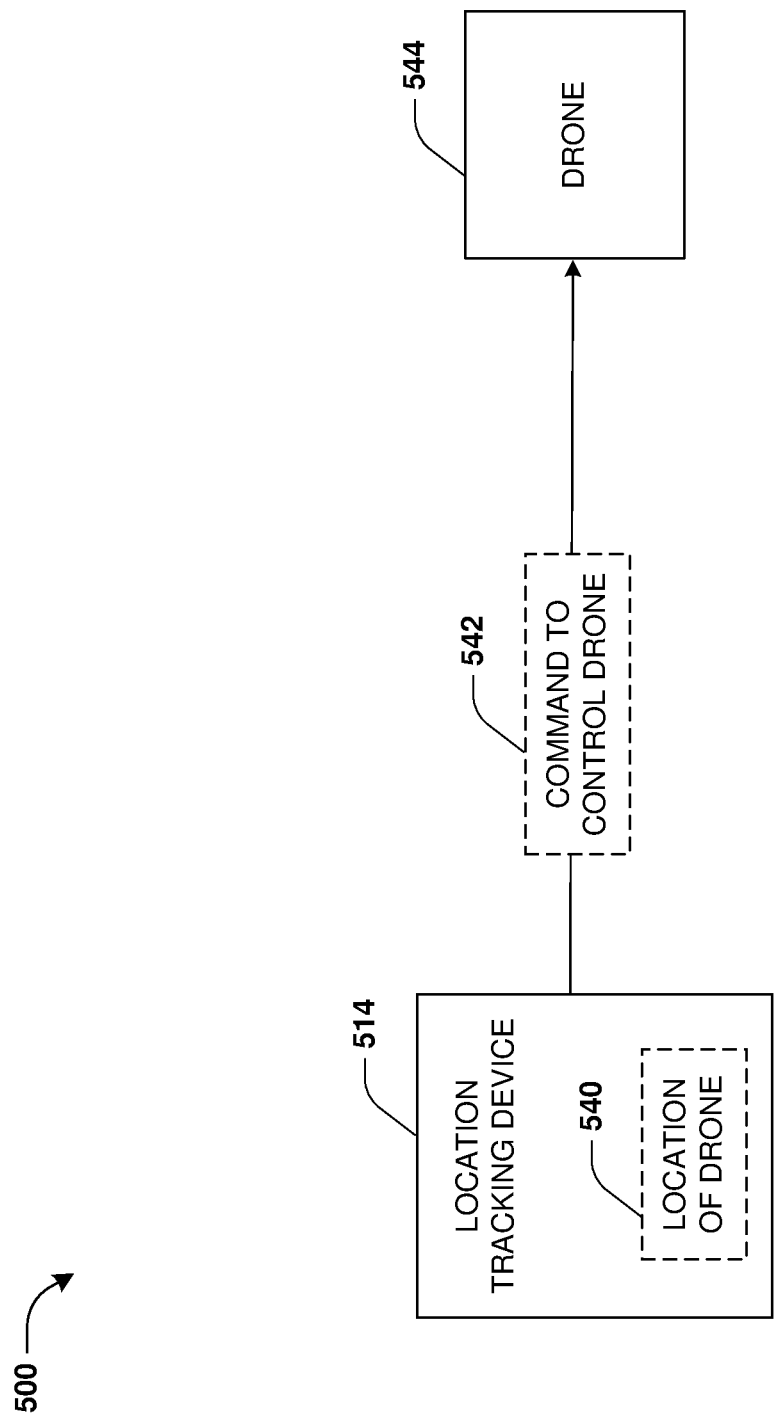
FIG. 5D is a diagram illustrating an example scenario associated with elevation tracking for devices, where an action is performed based upon an elevation of a device.

FIG. 5D illustrates the location tracking device 514 executing an action using location information 540 of a drone 544 in order to perform an action to generate and transmit a command 542 to control the drone 544. The drone 544 may be instructed to deliver a package within a building. The location tracking device 514 may receive a delivery location for the package within the building. In this way, the location tracking device 514 may use the delivery location and the location information 540 in order to transmit commands to control movement of the drone 544 within the building towards the delivery location.

FIG. 5E illustrates the location tracking device 514 executing an action using location information 550 of a device 554 within an indoor structure in order to perform an action to generate and transmit a user interface display command 552 to the device 554 for display through a user interface 556 of the device 554. The device 554 may request indoor location services from the location tracking device 514 in order to receive navigation instructions such as the user interface display command 552 for display through the user interface 556 in order to guide a user of the device 554 to a destination location.

According to some embodiments, a method may be provided. The method may include retrieving barometric pressure data points and elevation data points associated with a set of barometric measurement devices approximate to a device. The method includes generating an interpolated field of barometric pressure using the barometric pressure data points, wherein the barometric pressure data points are associated with elevation data points. The method includes projecting x, y location coordinates of the device onto the interpolated field as a projected point within the interpolated field. The method includes executing barometric leveling upon a device barometric pressure value provided by the device and a barometric pressure data point at the projected point to determine a relative height difference between the device and the projected point. The method includes, determining an elevation of the device from the relative height difference and the known elevation of the projected point within the interpolated field. The method includes performing an action based upon the elevation of the device.

According to some embodiments, the method includes in response to receiving a safety alert from a requesting device regarding the device, transmitting a location of the device to the requesting device, wherein the location is derived from the x, y location coordinates and the elevation of the device.

According to some embodiments, the method includes at least one of: executing, by an internet of things IoT device, the action to track a vertical location of the device within a building; transmitting a command to a drone to control operation of the drone based on the location of the drone, wherein the location is derived from the x, y location coordinates and the elevation of the device; or generating and transmitting navigation instructions to the device for display on a user interface of the device for user navigation within a building.

According to some embodiments, the method includes adding the relative height difference to an elevation of the projected point based upon the device being located above the interpolated field of barometric pressure.

According to some embodiments, the method includes subtracting the relative height difference from an elevation of the projected point based upon the device being located below the interpolated field of barometric pressure.

According to some embodiments, the method includes transmitting a vertical location of the device to an emergency dispatch system, wherein the vertical location is derived from the elevation of the device.

According to some embodiments, the method includes determining an indoor location for the device based upon the elevation of the device.

According to some embodiments, the method includes performing opportunistic calibration of the device to generate barometric pressure reading offsets; and applying the barometric pressure reading offsets to device barometric pressure values generated by the device to correct the device barometric pressure values.

According to some embodiments, the method includes utilizing a first barometric pressure data point of a first barometric measurement device, a second barometric pressure data point of a second barometric measurement device, and a third barometric pressure data point of a third barometric measurement device to assign the barometric pressure data point to the projected point.

According to some embodiments, the method includes utilizing a first elevation data point of a first barometric measurement device, a second elevation data point of a second barometric measurement device, and a third elevation data point of a third barometric measurement device to determine an elevation of the projected point.

According to some embodiments, the method includes in response to detecting that the device is within an indoor location, adjusting the device barometric pressure value based upon a temperature difference between an indoor temperature of the indoor location and an outdoor temperature outside of the indoor location.

According to some embodiments, the method includes utilizing at least one of an indoor average temperature assumption or an ambient temperature reading by the device as the indoor temperature.

According to some embodiments, the method includes utilizing a machine learning model to predict ambient temperature from a battery temperature of the device and a proximity sensor of the device.

According to some embodiments, a device is provided. The device comprises a processor. The processor is configured to execute instructions to facilitate performance of operations comprising retrieving barometric pressure data points and elevation data points associated with a set of barometric measurement devices proximate a device; generating an interpolated field of barometric pressure using the barometric pressure data points, wherein the barometric pressure data points are associated with elevation data points; identifying x, y location coordinates of the device; projecting the x, y location coordinates of the device onto the interpolated field as a projected point within the interpolated field; applying barometric pressure reading offsets to a device barometric pressure value generated by the device to correct the device barometric pressure value; executing barometric leveling upon the device barometric pressure value and a barometric pressure data point at the projected point to determine a relative height difference between the device and the projected point; and determining an elevation of the device based upon the relative height difference.

According to some embodiments, the operations include generating and transmitting an instruction to control operation of the device based upon the elevation of the device.

According to some embodiments, the operations include in response to determining that a sensor of the device indicates at least one of a change in surrounding conditions since a previous opportunistic calibration or a threshold distance has been travelled since the previous opportunistic calibration, determining whether the device is indoor or outdoor; and in response to determining that the device is outdoor, determining x, y, z location coordinates of the device based upon real-time kinematic positioning.

According to some embodiments, the operations include in response to determining that a sensor of the device indicates at least one of a change in surrounding conditions since a previous opportunistic calibration or a threshold distance has been travelled since the previous opportunistic calibration, determining whether the device is indoor or outdoor; and in response to determining that the device is outdoor, calculating a current elevation of the device relative to a cell site using a tangent of theta calculation and an elevation of the cell site for interpolation.

According to some embodiments, the operations include in response to determining that a sensor of the device indicates at least one of a change in surrounding conditions since a previous opportunistic calibration or a threshold distance has been travelled since the previous opportunistic calibration, determining whether the device is indoor or outdoor using at least one of a soundscape fingerprinting technique, building polygons, or transition detection; and in response to determining that the device is outdoor, determining a location of the device within an outdoor space.

According to some embodiments, the operations include detecting the change in surrounding conditions based upon at least one of magnetic fields, speed, barometric pressures, or sound levels detected by the device.

According to some embodiments, a non-transitory computer-readable medium storing instructions that when executed facilitate performance of operations, is provided. The operations include retrieving barometric pressure data points and elevation data points associated with a set of barometric measurement devices proximate a device; generating an interpolated field of barometric pressure using the barometric pressure data points, wherein the barometric pressure data points are associated with elevation data points; projecting x, y location coordinates of the device onto the interpolated field as a projected point within the interpolated field; applying barometric pressure reading offsets to a device barometric pressure value generated by the device correct the device barometric pressure value; executing barometric leveling upon the device barometric pressure value and a barometric pressure data point at the projected point to determine a relative height difference between the device and the projected point; and determining an elevation of the device based upon the relative height difference.

Figure 6:
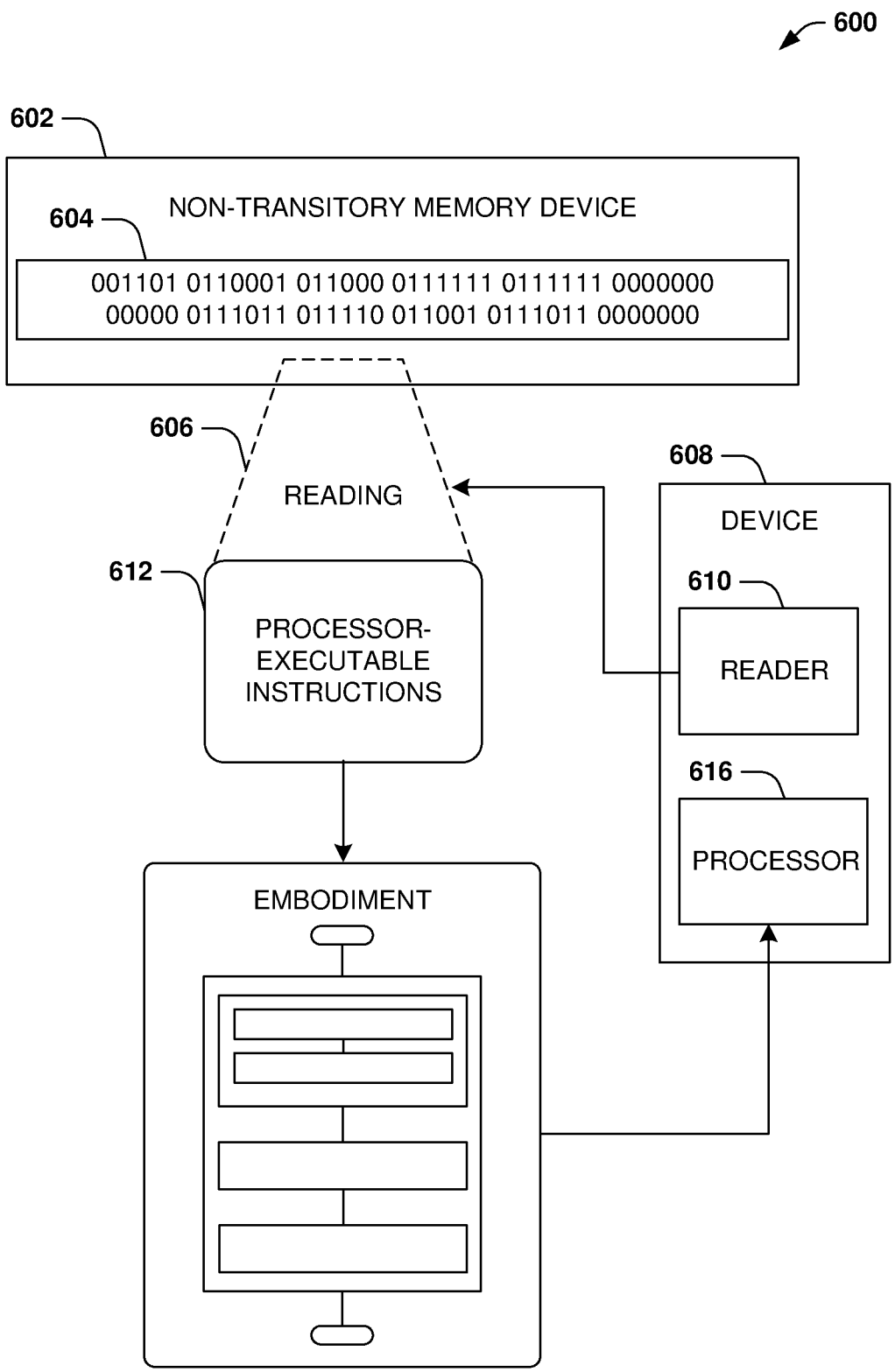
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIG. 3, at least some of the example system 400 of FIG. 4, and/or at least some of the example system 500 of FIGS. 5A-5E.

Figure 7:
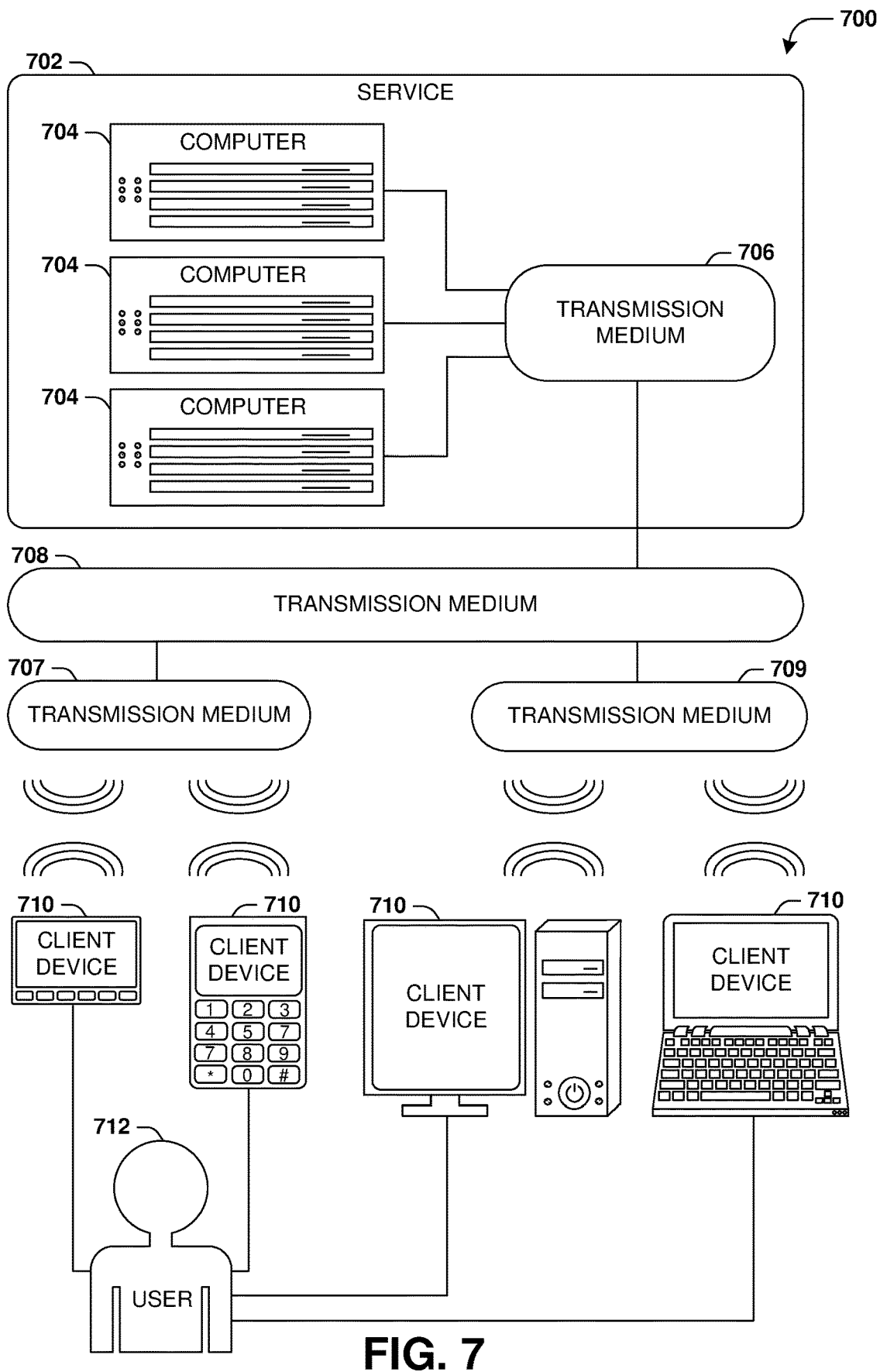
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
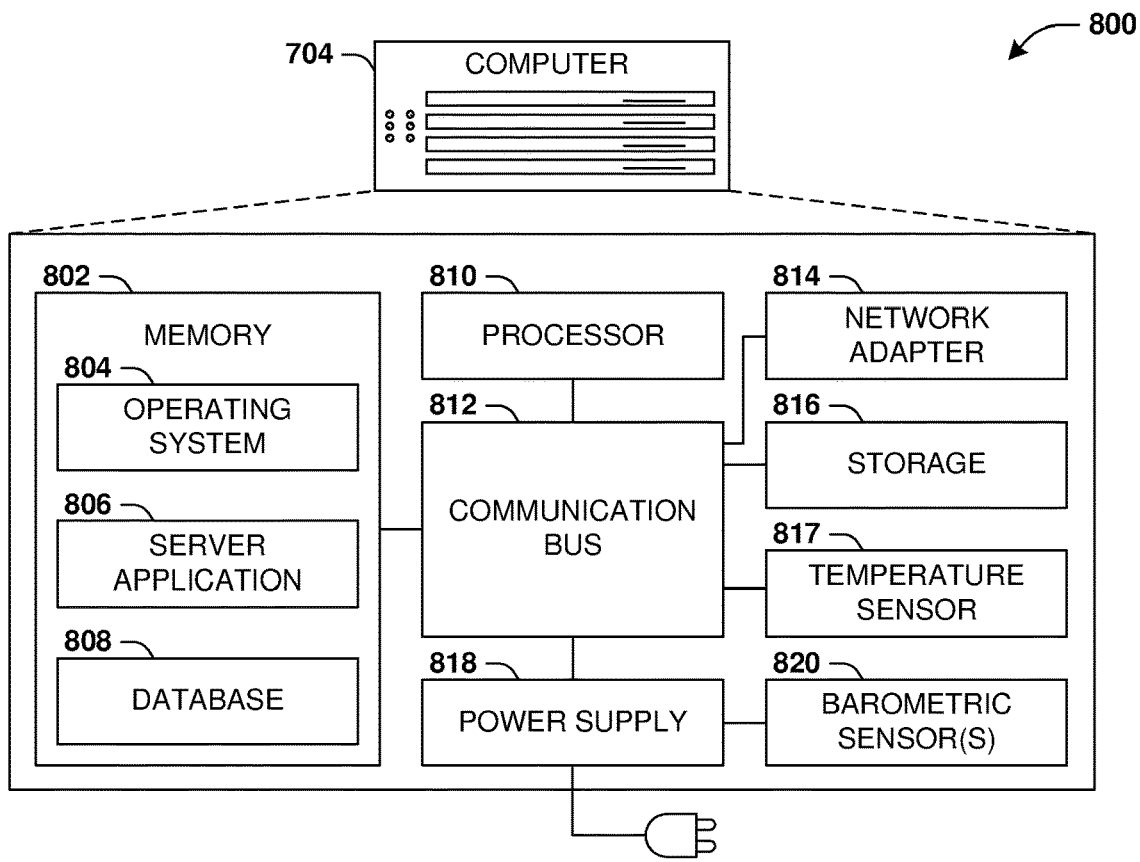
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may optionally comprise a temperature sensor. The computer 704 may comprise one or more barometric sensors 820 configured to measure barometric pressure. Many such computers 704 may be configured and/or adapted to utilize at least a portion of the techniques presented herein.

Figure 9:
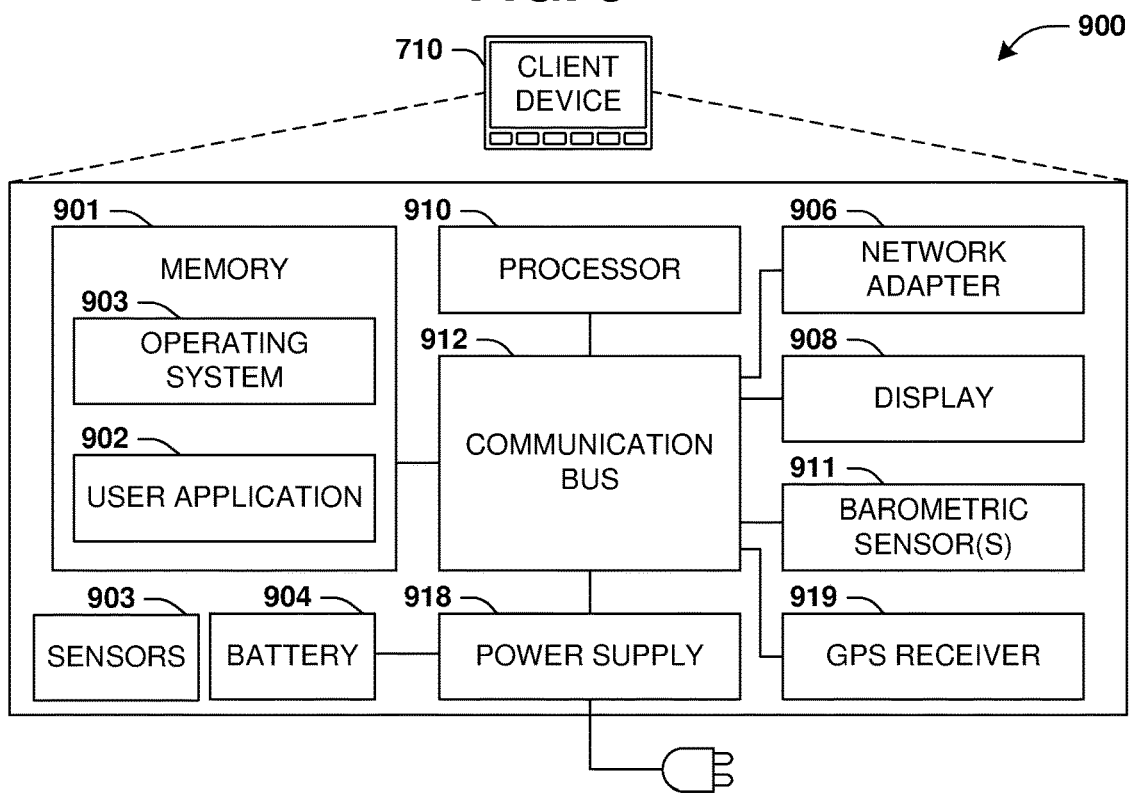
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance. In some embodiments, the client device 710 comprises one or more sensors 903, such as one or more barometric sensors configured to measure barometric pressure and/or optionally a temperature sensor.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   retrieving barometric pressure data points and elevation data points generated by a set of barometric measurement devices proximate a device;
   generating an interpolated field of barometric pressure using the barometric pressure data points;
   projecting x, y location coordinates of the device onto the interpolated field as a projected point within the interpolated field;
   performing opportunistic calibration of the device to generate barometric pressure reading offsets;
   applying the barometric pressure reading offsets to device barometric pressure values generated by the device to correct the device barometric pressure values;
   executing barometric leveling upon a device barometric pressure value, of the corrected device barometric pressure values, provided by the device and a barometric pressure data point at the projected point to determine a relative height difference between the device and the projected point;
   determining an elevation of the device based upon the relative height difference; and
   generating at least one of a command or instructions based upon the elevation of the device.

2. The method of claim 1, comprising:
   in response to receiving a safety alert from a requesting device regarding the device, transmitting a location of the device to the requesting device, wherein the location is derived from the x, y location coordinates and the elevation of the device.

3. The method of claim 1, comprising at least one of:
   tracking, by an internet of things IoT device, a vertical location of the device within a building;
   transmitting the command to a drone to control operation of the drone based upon a location of the drone, wherein the location is derived from the x, y location coordinates and the elevation of the device; or
   generating and transmitting navigation instructions to the device for display on a user interface of the device for user navigation within a building.

4. The method of claim 1, comprising:
   adding the relative height difference to an elevation of the projected point based upon the device being located above the interpolated field of barometric pressure.

5. The method of claim 1, comprising:
   subtracting the relative height difference from an elevation of the projected point based upon the device being located below the interpolated field of barometric pressure.

6. The method of claim 1, comprising:
   transmitting a vertical location of the device to an emergency dispatch system, wherein the vertical location is derived from the elevation of the device.

7. The method of claim 1, comprising:
   determining an indoor location for the device based upon the elevation of the device.

8. The method of claim 1, comprising:
   transmitting at least one of the command or the instructions to control operation of a second device.

9. The method of claim 1, wherein the generating the interpolated field comprises:
   utilizing a first barometric pressure data point of a first barometric measurement device, a second barometric pressure data point of a second barometric measurement device, and a third barometric pressure data point of a third barometric measurement device to assign the barometric pressure data point to the projected point.

10. The method of claim 1, wherein the generating the interpolated field comprises:
    utilizing a first elevation data point of a first barometric measurement device, a second elevation data point of a second barometric measurement device, and a third elevation data point of a third barometric measurement device to determine an elevation of the projected point.

11. The method of claim 1, comprising:
    in response to detecting that the device is within an indoor location, adjusting the device barometric pressure value based upon a temperature difference between an indoor temperature of the indoor location and an outdoor temperature outside of the indoor location.

12. The method of claim 11, comprising:
    utilizing at least one of an indoor average temperature assumption or an ambient temperature reading by the device as the indoor temperature.

13. The method of claim 11, comprising:
    utilizing a machine learning model to predict ambient temperature from a battery temperature of the device and a proximity sensor of the device.

14. A computing device comprising:
    a processor configured to execute instructions to facilitate performance of operations comprising:
    retrieving barometric pressure data points and elevation data points generated by a set of barometric measurement devices proximate a device;
    generating an interpolated field of barometric pressure using the barometric pressure data points;
    identifying x, y location coordinates of the device;
    projecting the x, y location coordinates of the device onto the interpolated field as a projected point within the interpolated field;
    applying barometric pressure reading offsets to a device barometric pressure value generated by the device to correct the device barometric pressure value;
    executing barometric leveling upon the device barometric pressure value and a barometric pressure data point at the projected point to determine a relative height difference between the device and the projected point;

in response to determining that a sensor of the device indicates at least one of a change in surrounding conditions since a previous opportunistic calibration or a threshold distance has been travelled since the previous opportunistic calibration, determining whether the device is indoor or outdoor;

in response to determining that the device is outdoor, calculating a current elevation of the device relative to a cell site using a tangent of theta calculation and an elevation of the cell site for interpolation; and generating at least one of a command or instructions based upon the current elevation of the device.

15. The computing device of claim 14, wherein the operations comprise:

transmitting at least one of the command or the instructions to control operation of the device.

16. The computing device of claim 14, wherein the operations comprise:

in response to determining that the device is outdoor, determining x, y, z location coordinates of the device based upon real-time kinematic positioning.

17. The computing device of claim 14, wherein the operations comprise:

transmitting at least one of the command or the instructions to control operation of a second device.

18. The computing device of claim 14, wherein the operations comprise:

determining whether the device is indoor or outdoor using at least one of a soundscape fingerprinting technique, building polygons, or transition detection; and in response to determining that the device is outdoor, determining a location of the device within an outdoor space.

19. The computing device of claim 18, wherein the operations comprise:

detecting the change in surrounding conditions based upon at least one of magnetic fields, speed, barometric pressures, or sound levels detected by the device.

20. A non-transitory computer-readable medium storing instructions that when executed facilitate performance of operations comprising:

retrieving barometric pressure data points and elevation data points generated by a set of barometric measurement devices proximate a device;

generating an interpolated field of barometric pressure using the barometric pressure data points;

projecting x, y location coordinates of the device onto the interpolated field as a projected point within the interpolated field;

in response to detecting that the device is within an indoor location, adjusting a device barometric pressure value of the device based upon a temperature difference between an indoor temperature of the indoor location and an outdoor temperature outside of the indoor location;

executing barometric leveling upon the adjusted device barometric pressure value and a barometric pressure data point at the projected point to determine a relative height difference between the device and the projected point;

determining an elevation of the device based upon the relative height difference; and generating at least one of a command or instructions based upon the elevation of the device.

* * * * *